United States Patent
Morszeck

(10) Patent No.: US 10,058,151 B2
(45) Date of Patent: Aug. 28, 2018

(54) STORAGE DEVICE WITH THREE-DIMENSIONAL PROTRUSIONS

(71) Applicant: Rimowa GmbH, Cologne (DE)

(72) Inventor: Dieter Morszeck, Cologne (DE)

(73) Assignee: RIMOWA GmbH, Cologne (DE)

( * ) Notice: Subject to any disclaimer, the term of this patent is extended or adjusted under 35 U.S.C. 154(b) by 0 days.

(21) Appl. No.: 14/777,809

(22) PCT Filed: Mar. 28, 2014

(86) PCT No.: PCT/EP2014/056286
§ 371 (c)(1),
(2) Date: Sep. 17, 2015

(87) PCT Pub. No.: WO2014/170116
PCT Pub. Date: Oct. 23, 2014

(65) Prior Publication Data
US 2016/0278492 A1     Sep. 29, 2016

(30) Foreign Application Priority Data
Mar. 28, 2013   (DE) .................... 20 2013 002 981 U

(51) Int. Cl.
*A45C 5/02* (2006.01)
*A45C 5/03* (2006.01)
(Continued)

(52) U.S. Cl.
CPC .................. *A45C 5/02* (2013.01); *A45C 1/06* (2013.01); *A45C 5/03* (2013.01); *A45C 13/08* (2013.01);
(Continued)

(58) Field of Classification Search
CPC .... A45C 5/02; A45C 1/06; A45C 5/03; A45C 13/08; A45C 2005/037; B32B 3/30;
(Continued)

(56) References Cited

U.S. PATENT DOCUMENTS

| 290,466 | A | * | 12/1883 | Peck et al. | ........... A47B 95/043 |
|---|---|---|---|---|---|
| | | | | | 248/345.1 |
| 358,012 | A | * | 2/1887 | Bray | ........................ A45C 5/02 |
| | | | | | 190/24 |

(Continued)

FOREIGN PATENT DOCUMENTS

| CN | 201175550 Y | 1/2009 |
|---|---|---|
| CN | 202213407 U | 5/2012 |

(Continued)

OTHER PUBLICATIONS

International Search Report of corresponding PCT/EP2014/056286 dated Aug. 14, 2014; 4pgs.
(Continued)

*Primary Examiner* — Tri Mai
(74) *Attorney, Agent, or Firm* — Maier & Maier, PLLC

(57) ABSTRACT

In a storage device, in particular a piece of baggage or a wallet, having at least one outer surface, it is provided that an additional outer layer is provided on the outer surface, said layer having at least one three-dimensional protrusion formed therein by a thermoforming process and protruding from the outer surface.

5 Claims, 4 Drawing Sheets

(51) Int. Cl.
*A45C 13/08* (2006.01)
*B32B 9/02* (2006.01)
*B32B 9/04* (2006.01)
*B32B 3/30* (2006.01)
*A45C 1/06* (2006.01)

(52) U.S. Cl.
CPC ............... *B32B 3/30* (2013.01); *B32B 9/025* (2013.01); *B32B 9/04* (2013.01); *A45C 2005/037* (2013.01); *B32B 2439/00* (2013.01); *B32B 2439/40* (2013.01)

(58) Field of Classification Search
CPC ....... B32B 9/025; B32B 9/04; B32B 2439/00; B32B 2439/40
See application file for complete search history.

(56) References Cited

U.S. PATENT DOCUMENTS

| | | | | |
|---|---|---|---|---|
| 371,554 | A * | 10/1887 | Crouch | A45C 5/02 190/24 |
| 500,352 | A * | 6/1893 | Rogers | A45C 5/02 190/25 |
| 1,057,913 | A * | 4/1913 | Andrews | B65D 9/34 190/37 |
| 1,211,165 | A * | 1/1917 | Kaufmann | A45C 13/36 190/37 |
| 2,878,907 | A * | 3/1959 | Kivett | A45C 5/02 190/125 |
| 4,201,289 | A * | 5/1980 | Mack | A61L 9/12 206/0.5 |
| 4,244,156 | A * | 1/1981 | Watts, Jr. | E02D 5/226 264/46.5 |
| 4,703,519 | A | 10/1987 | Krenzel | |
| 4,817,769 | A * | 4/1989 | Saliba | A44B 19/301 190/120 |
| 4,838,427 | A * | 6/1989 | Hurley | B29C 51/162 206/326 |
| 5,004,091 | A * | 4/1991 | Natho | A45C 5/02 150/129 |
| 5,065,847 | A * | 11/1991 | Hsieh | A45C 5/02 190/122 |
| 5,228,546 | A | 7/1993 | Chang et al. | |
| 5,871,834 | A * | 2/1999 | Wang | B44F 1/14 359/359 |
| 6,047,752 | A * | 4/2000 | Southwick | A45C 3/00 150/112 |
| 6,256,015 | B1 * | 7/2001 | Adler | G06F 3/039 345/163 |
| 6,322,866 | B1 * | 11/2001 | Sloot | B32B 3/00 2/246 |
| 6,325,189 | B1 * | 12/2001 | King | A45C 3/001 190/119 |
| 2003/0162001 | A1 * | 8/2003 | Rosch | B29C 45/14811 428/192 |
| 2006/0048413 | A1 | 3/2006 | Sokolowski | |
| 2009/0065110 | A1 * | 3/2009 | Cassella | A45C 13/02 150/104 |
| 2009/0101460 | A1 * | 4/2009 | Justham | A45C 5/03 190/16 |
| 2013/0213752 | A1 * | 8/2013 | Meersschaert | A45C 5/02 190/125 |

FOREIGN PATENT DOCUMENTS

| | | |
|---|---|---|
| DE | 102005006541 A1 | 8/2006 |
| DE | 20 2005 012291 U1 | 12/2006 |
| WO | 2012/056035 A2 | 5/2012 |

OTHER PUBLICATIONS

Taiwanese Office Action dated Mar. 17, 2017, in connection with corresponding TW Application No. 10620286340 (1 pg.).
Australian examination report dated Sep. 13, 2017, in connection with corresponding Australian Application No. 2014255997 (3 pgs.).
A Singapore Invitation to Respond to Written Opinion dated May 30, 2017, in connection with corresponding Singapore Application No. 11201507905X (1 pg.).
Australian Examination Report No. 2 dated Apr. 16, 2018, in connection with corresponding AU Application No. 2014255997 (4 pgs.).

* cited by examiner

STORAGE DEVICE WITH THREE-DIMENSIONAL PROTRUSIONS

BACKGROUND OF THE INVENTION

Field of the Invention

The present invention relates to a storage device with three-dimensional protrusions according to the precharacterizing part of claim 1.

Description of the Prior Art

Storage devices exist, in particular suitcases with three-dimensional protrusions. With hard-shell cases, for example, these three-dimensional protrusions are provided in the mold during the production.

However, there is a need for a simple and economic way of producing such three-dimensional protrusions.

SUMMARY OF THE INVENTION

It is an object of the invention to provide a simple and economic manner for applying three-dimensional protrusions on the outer surface of storage devices. The object is achieved with the features of claim 1.

The invention advantageously provides that an additional layer is arranged on the outer surface, said additional layer comprising at least one three-dimensional protrusion formed therein by a thermoforming process and protruding from the outer surface.

The present invention has the advantage that the three-dimensional protrusions can be made in a simple and economic manner, while the shape of the three-dimensional protrusions can be varied as desired.

The at least one three-dimensional protrusion may be rib-shaped.

The at least one rib-shaped protrusion can be hollow.

The outer layer may be made of plastic material, leather or a textile material.

The outer layer may be applied onto the outer surface by means of an adhesive layer. The three-dimensional protrusion can have a triangular cross section.

At least one raised portion can be provided on the outer surface, which is conformed to the shape of the at least one three-dimensional protrusion, the outer layer being arranged on the outer surface in such a manner that the at least one three-dimensional raised portion arranged on the outer surface is provided beneath the at least three-dimensional protrusion of the outer layer.

This has the advantage that the three-dimensional protrusion is not hollow and can therefore not be dented when forces are applied thereto.

In this manner, the three-dimensional protrusion retains its contour for a long time.

The at least one three-dimensional raised portion arranged on the outer surface may comprise two stacked and interconnected layers.

The at least two layers may be printed onto the outer surface. This has the advantage that the layers can be applied onto the outer surface in a simple and economic manner. Further, the width and the shape of the layers can vary so that the shape of the three-dimensional raised portion is variable. In this manner, the shape of the three-dimensional raised portion can easily be adapted to the three-dimensional protrusion of the outer layer.

The layers can be produced using a 3D printing method or a screen printing method.

Further, a method for producing a piece of baggage can be provided, which comprises the following steps:

producing a piece of baggage having at least one outer surface, producing at least one additional outer layer, applying rib-shaped protrusions into the additional outer layer by means of thermoforming, fastening, preferably by adhesion, the outer layer on the at least one outer surface.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which the Figures schematically show FIG. 1 a storage device formed as a piece of baggage, comprising three-dimensional protrusions on the outer surface, FIG. 2 a storage device formed as a bag, FIG. 3 the storage device of FIG. 2 in lateral view, FIG. 4 three-dimensional protrusions on the outer surface of a storage device in lateral view, FIG. 5 an alternative embodiment, FIG. 6 the embodiment of FIG. 4 in lateral view, FIG. 7 an alternative embodiment, FIG. 8 another alternative embodiment, FIG. 9 a thermoforming plant for applying three-dimensional protrusions into the outer layer.

DETAILED DESCRIPTION OF PREFERRED EMBODIMENTS

Figure 1:
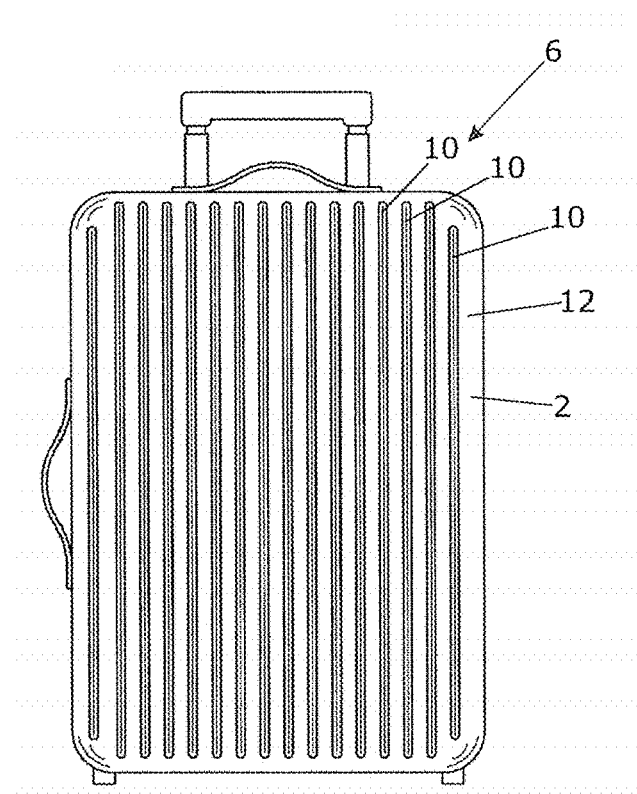

FIG. 1 shows a storage device formed as a suitcase 6. Said suitcase 6 is a piece of baggage. Suitcase 6 comprises at least one outer surface 12, wherein said outer surface is provided with an additional outer layer 2 having three-dimensional protrusions 10 applied by means of a thermoforming process and extending outward relative to said outer surface 12. The three-dimensional protrusions 10 are rib-shaped. The design of the three-dimensional protrusions 10 is illustrated in greater detail in FIGS. 4-8. The suitcase can be a hard-shell suitcase made of aluminum or plastic (e.g. PE).

Figure 2:
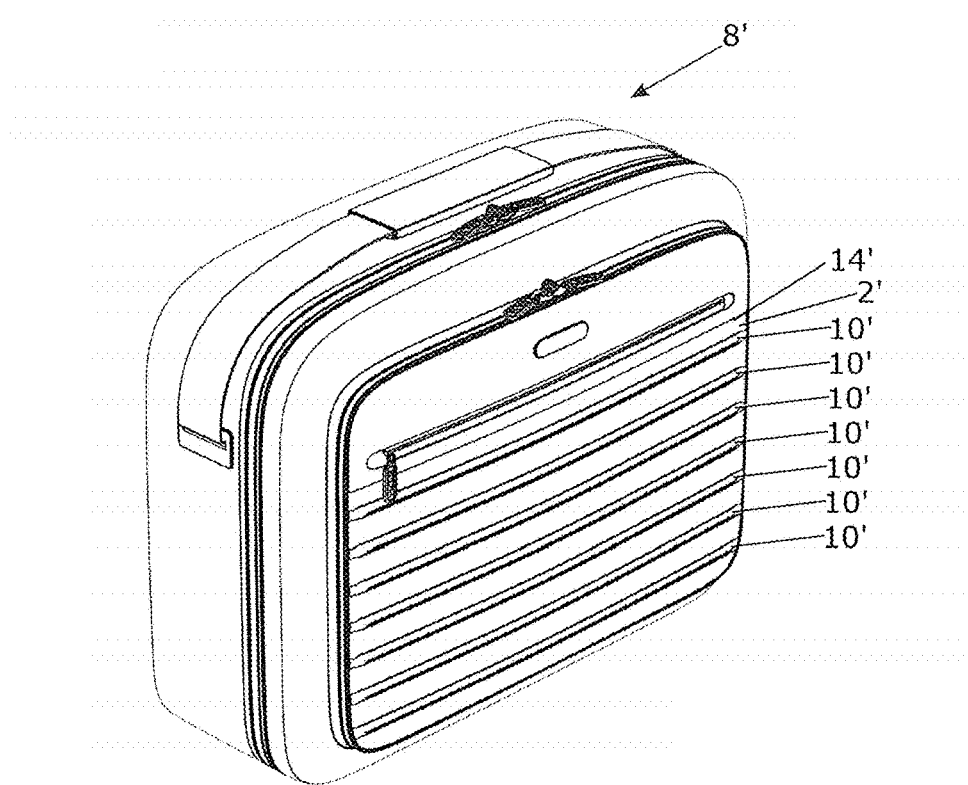
Figure 3:
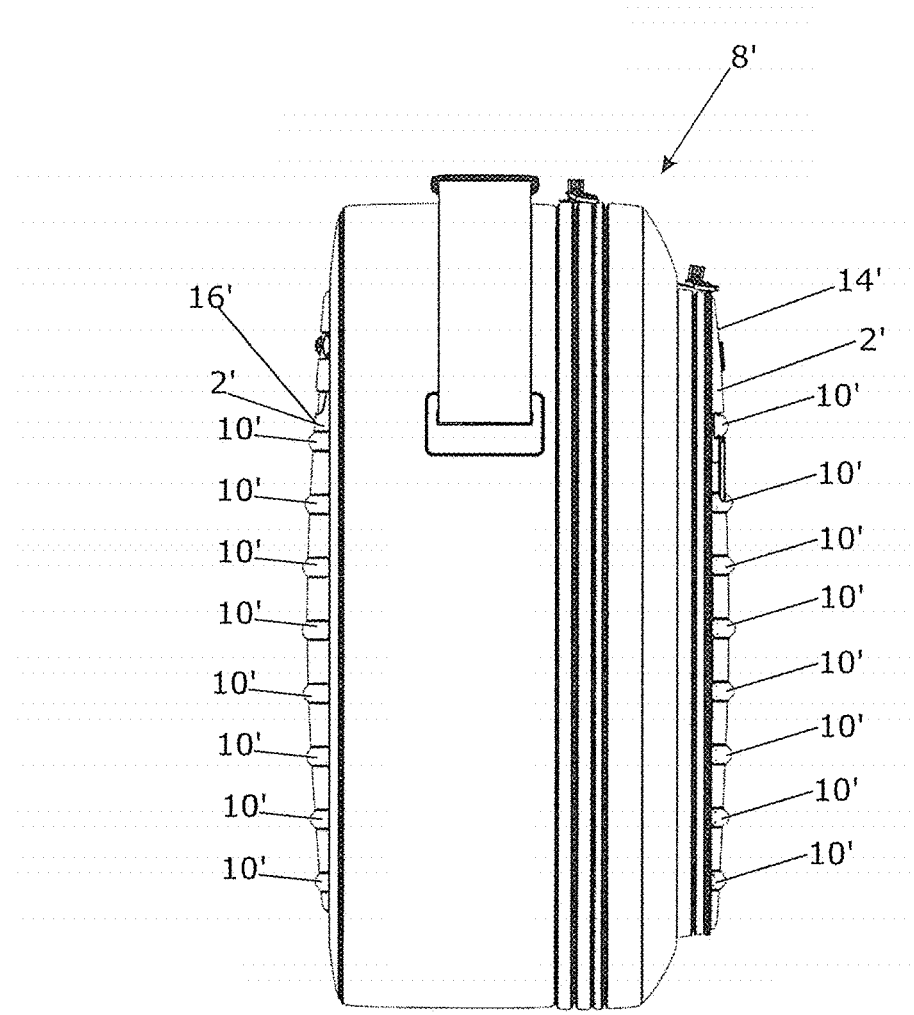

FIG. 2 shows a storage device formed as a bag 8'. Said bag 8' comprises at least one outer surface 14' and one outer surface 16' which form the front side and respectively rear side of bag 8'. On at least one of said outer surfaces 14', 16', projecting three-dimensional protrusions 10' are arranged. These three-dimensional protrusions 10' are applied into an outer layer by means of a thermoforming process, said outer layer being arranged on the outer surface 14', 16'. Said three-dimensional protrusions 10' are rib-shaped. On a given outer surface 14' and respectively 16', a plurality of such three-dimensional protrusions 10' are arranged, the protrusions 10' running parallel next to each other. In FIG. 3, bag 8' is shown in lateral view. The three-dimensional protrusions are only shown schematically in FIGS. 1-3.

It can be provided that the storage devices shown in FIGS. 1, 2 and 3, i.e. suitcase 6 and bag 8', comprise three-dimensional protrusions 10 and 10' only on one of their outer surfaces 12, 14'. Alternatively, suitcase 6 and bag 8' can comprise three-dimensional protrusions 10 and 10' also on two or more of their outer surfaces 12, 14', 16'.

Preferably, suitcase 6 of FIG. 1 comprises three-dimensional protrusions on all outer surfaces.

Preferably, the respective outer surfaces 12, 14', 16' are provided with a plurality of three-dimensional protrusions 10 and 10', wherein these three-dimensional protrusions 10 and 10' are preferably rib-shaped, and the rib-shaped three-dimensional protrusions 10 and 10' are preferably arranged parallel next to each other and at equal distances to each other. The three-dimensional protrusions 10 and 10' can also be arranged on the outer surface of a purse.

The design of the three-dimensional protrusions 10 and 10' of the storage device in FIGS. 1-3 is illustrated in more detail in FIGS. 4-8.

Figure 4:
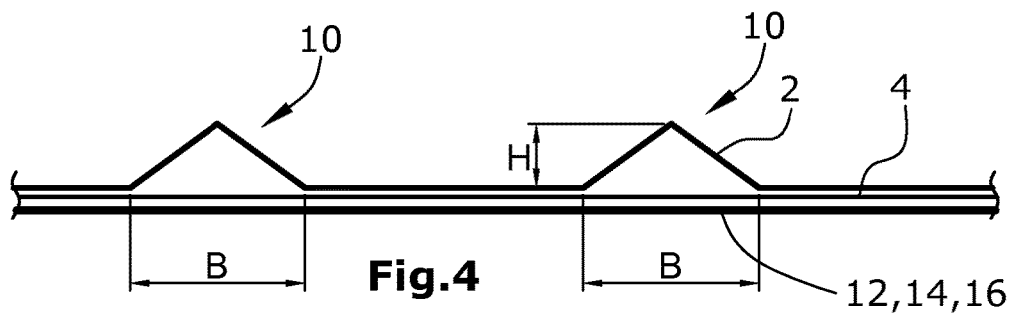

FIG. 4 illustrates three-dimensional protrusions 10. The three-dimensional protrusions 10 have been formed in an outer layer 2 by means of a thermoforming process. Three-dimensional means that the protrusions have a width B, a length L and a height H. The outer layer 2 is applied onto the respective outer surfaces 12, 14, 16 by means of an adhesive layer 4. Owing to the thermoforming process, the shape of the three-dimensional protrusions formed in the outer layer 2 can be varied as desired. In FIG. 4, three-dimensional rib-shaped protrusions 10 are illustrated that have a triangular cross-sectional shape. Thus, the height of the three-dimensional protrusion changes across the width B. The three-dimensional protrusion 10 tapers conically. The three-dimensional protrusions 10 illustrated are hollow. The outer layer 2 may be made of plastic material, leather or a textile tissue.

Figure 5:
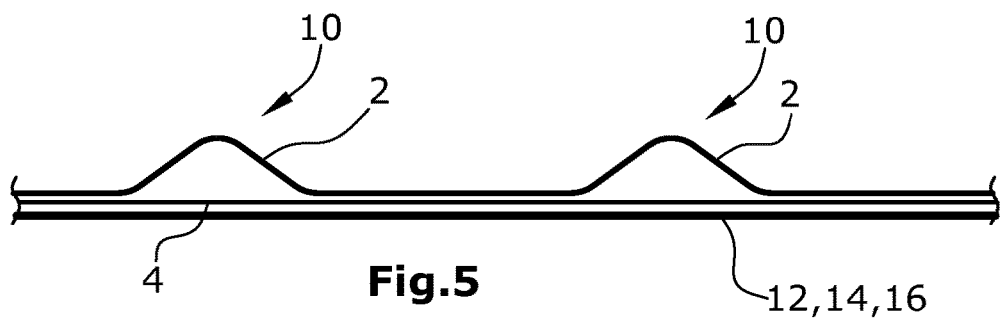

However, the three-dimensional protrusions 10 may as well have any other shape. FIG. 5 shows three-dimensional protrusions rounded at the tip.

Figure 6:
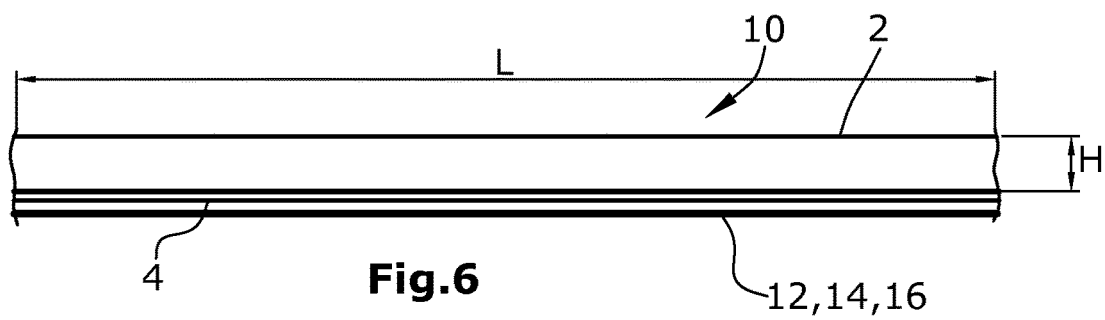

In FIG. 6, the three-dimensional protrusions 10 of FIG. 4 are illustrated in lateral view. The three-dimensional protrusion 10 of the embodiment illustrated in FIG. 6 has a constant height H along the length L.

Figure 7:
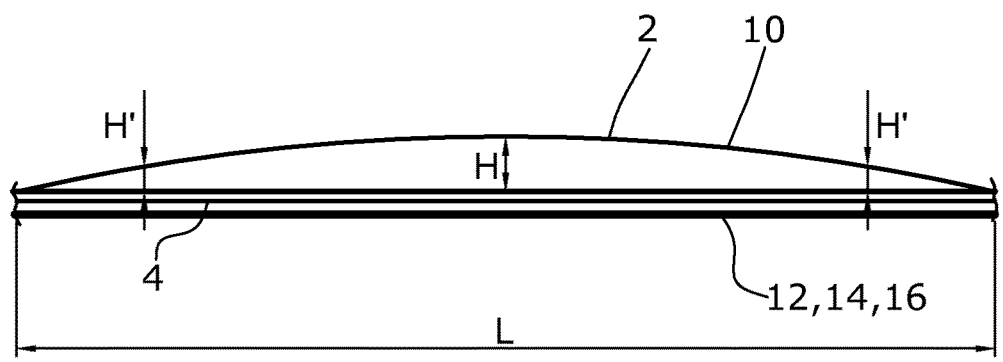

FIG. 7 illustrates an embodiment in which the three-dimensional protrusion 10 varies in height H along the length L. In the edge portions, the height H decreases continuously and runs out towards the end regions.

Figure 8:
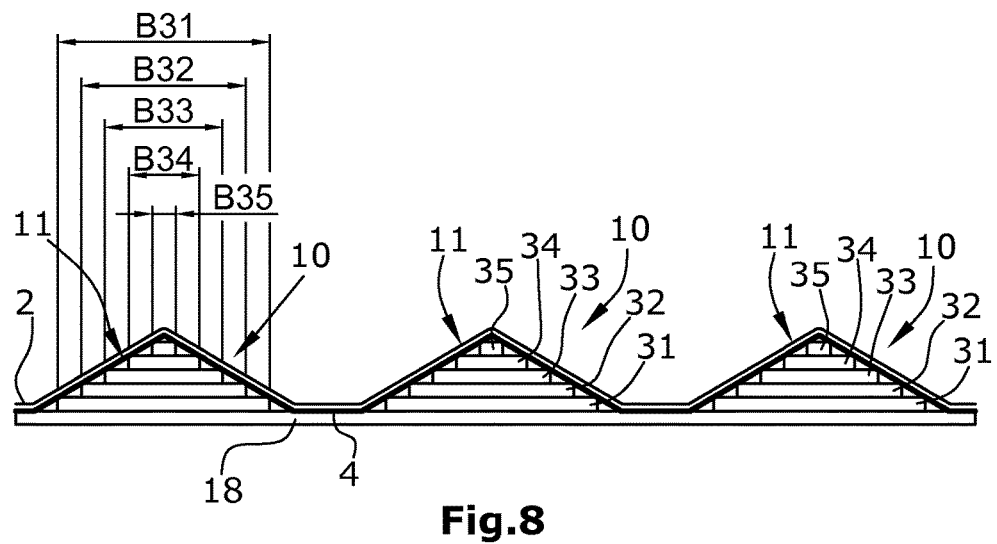

FIG. 8 illustrates another alternative embodiment. In this case, raised portions 11 are arranged on the outer surface 12, 14, 16, which portions are adapted to the shape of the at least one three-dimensional protrusion 10, the outer layer 2 being arranged on the outer surface 12, 14, 16 such that the at least one raised portion 11 arranged on the outer surface 12, 14, 16 is arranged beneath the at least one three-dimensional protrusion 10 of the outer layer 2.

The three-dimensional raised portions 11 provided on the outer surface 12, 14, 16 each comprise at least two stacked and joined layers.

The layers 31-35, stacked upon and joined with each other, may be formed on the outer surface 14, 16, 12 by means of a printing process, for example. In this regard, a first layer 31 is printed on the outer surface 12, 14, 16. This first layer 31 forms the lowermost layer and is the layer adjacent the outer surface 12, 14, 16. Thereafter, a second layer 32 is printed on the first layer 31. The third layer 33 is then printed on the second layer 32, the fourth layer 34 is printed on the third layer 33, and the fifth layer 35 is printed on the fourth layer 34. In the embodiment illustrated, the fifth layer 35 is the topmost layer and is the layer farthest from the outer surface 12, 14, 16. The three-dimensional raised part may as well comprise another number of layers.

Due to the fact that the layers 31-35 are printed on the outer surface 12, 14, 16 and the three-dimensional raised portions 11 are formed by a plurality of layers 31-35, the three-dimensional raised portion can have any desired shape. In this manner, the shape and the design of the three-dimensional raised portion can be changed as desired in a production process and be adapted to the three-dimensional protrusion 10.

In the embodiment of FIG. 8, five layers are arranged one upon the other, respectively. The layers 31-35 vary in their width from B31 to B35. The width B31 of the layer 31 that is provided in contact with the outer surface 12, 14, 16 is the largest width. The width B35 of the layer 35 farthest from the outer surface 12, 14, 16 is the smallest width. The widths B32-B34 of the layers 32-35, situated between the layers 31 and 35, vary in width between the widths B31 and B35 so that the three-dimensional raised portions 11 tape conically and are adapted to the three-dimensional protrusions 10 of the outer layer 2. Further, the lengths L of the layers and the thicknesses D of the layers can vary. The outer layer 2 is applied on the outer surface 12, 14, 16 and on the three-dimensional raised portions 11 by means of an adhesive layer 4.

Figure 9:
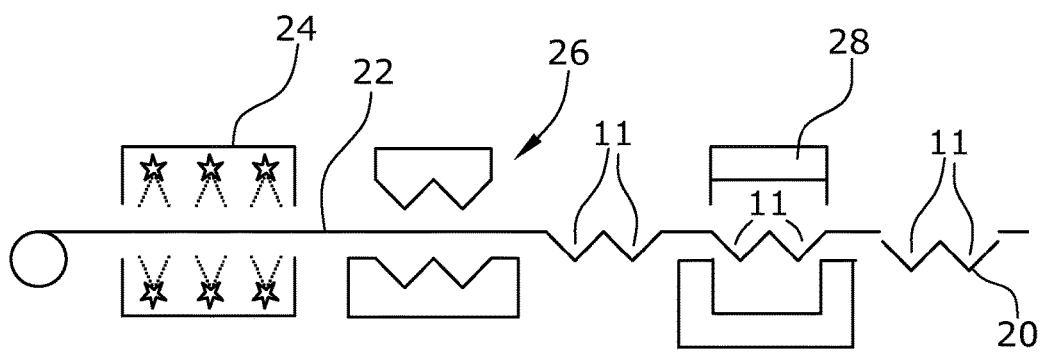

With reference to FIG. 9, it will be explained how the three-dimensional protrusions 10 are formed in the outer layer 2 by means of a thermoforming process. A web-shaped fabric 22 can be unwound from a roll and be heated in a heating oven 24. After having been heated in the heating oven 24, the web-shaped layer 22 is introduced into a forming means 26 in which the three-dimensional protrusions, in particular the rib-shaped three-dimensional protrusions, are formed in the web-shaped layer. This is effected by means of a pressing means having the shape of the three-dimensional protrusions. Downstream of the forming means 26, the web-shaped layer is severed into individual segments in a punching means 28 so that the outer layer 2 is formed. The outer layer 2 has the outer dimensions of the outer surfaces 12, 14, 16.

As an alternative, it is also possible to use plate material in a thermoforming process instead of the web-shaped layer, the plate material already having the dimensions of the respective outer surface 12, 14, 16. This plate material is heated and formed.

Thus, in a method for producing a piece of baggage, the following steps are carried out:
producing a piece of baggage having at least one outer surface,
producing at least one additional outer layer 2,
forming rib-shaped protrusions 10 in the additional outer layer 2 by means of thermoforming, and
fixing, preferably adhering, the outer layer on the at least one outer surface.

The invention claimed is:

1. A suitcase comprising:
at least one outer surface, wherein an additional layer is arranged on said outer surface, said additional layer having the same outer dimensions as the outer surface, said additional layer having at least one three-dimensional protrusion pre-formed therein by a thermoforming process, wherein the outer surface has at least one raised portion provided thereon which matches the shape of the at least one three-dimensional protrusion pre-formed in the additional layer, the additional layer being arranged on the outer surface such that the at least one three-dimensional raised portion arranged on the outer surface is situated beneath the at least one three-dimensional protrusion of the additional layer,
wherein the at least one raised portion of the outer surface comprises at least two stacked and joined layers having varying widths matching the shape of a corresponding pre-formed protrusion in the additional layer, and wherein the additional layer is adhered to the outer surface and the raised portion of the outer surface comprising at least two stacked and joined layers.

2. The suitcase of claim 1, wherein the at least one three-dimensional protrusion is rib-shaped.

3. The suitcase of claim 1, wherein the additional layer is applied on the outer surface of an adhesive layer.

4. The suitcase of claim 1, wherein the three-dimensional protrusion has a triangular cross-sectional shape.

5. The suitcase of claim 1, wherein the at least two stacked and joined layers are printed on the outer surface.

* * * * *